US00RE44490E

(19) United States
(12) Reissued Patent
Kirstein et al.

(10) Patent Number: US RE44,490 E
(45) Date of Reissued Patent: Sep. 10, 2013

(54) ELECTRICAL CLAMP CONNECTOR AND CONNECTING TERMINAL

(75) Inventors: Axel Kirstein, Schernberg (DE); Konrad Stromiedel, Wolkramshausen (DE)

(73) Assignee: Wago Verwaltungsgesellschaft mbH (DE)

(21) Appl. No.: 13/253,234

(22) Filed: Oct. 5, 2011

Related U.S. Patent Documents

Reissue of:
(64) Patent No.: 7,384,319
Issued: Jun. 10, 2008
Appl. No.: 11/789,563
Filed: Apr. 25, 2007

(30) Foreign Application Priority Data

Apr. 28, 2006 (DE) ..... 10 2006 020 469

(51) Int. Cl.
*H01R 4/48* (2006.01)

(52) U.S. Cl.
USPC ..... 439/839; 439/439

(58) Field of Classification Search
USPC ..... 439/212–213, 439, 441, 511, 513, 439/723, 786–787, 839, 952
See application file for complete search history.

(56) References Cited

U.S. PATENT DOCUMENTS

| | | | | |
|---|---|---|---|---|
| 3,945,711 | A * | 3/1976 | Hohorst et al. | 439/723 |
| 4,217,021 | A * | 8/1980 | Illum | 439/787 |
| 6,132,238 | A * | 10/2000 | Hartmann et al. | 439/439 |
| 7,101,231 | B2 * | 9/2006 | Prokup et al. | 439/709 |
| 7,150,646 | B2 * | 12/2006 | Trumper | 439/441 |

FOREIGN PATENT DOCUMENTS

| | | | |
|---|---|---|---|
| DE | 94 20 097 | | 1/1996 |
| DE | 9420097 | U1 * | 2/1996 |
| DE | 196 54 523 | | 7/1998 |
| DE | 19654523 | C2 * | 10/2003 |

* cited by examiner

*Primary Examiner* — Khiem Nguyen
(74) *Attorney, Agent, or Firm* — Salter & Michaelson

(57) ABSTRACT

The invention relates to an electrical clamp connector and connecting terminal that, per pole, has at least two conductor terminal connections oriented in the same direction and an additional connecting contact on the opposite-lying side, which serves for connecting a countercontact external to the terminal. It is proposed for such a terminal to use the especially small-construction design features of a terminal that is produced from a single piece of spring steel sheet and a busbar rod, and to combine these with the new features that the busbar rod has one or two cross projections, which project through the free opening in the spring steel sheet and form the additional connecting contact, which, for example, may be constructed in the form of a socket contact or in the form of a plug-in contact.

11 Claims, 2 Drawing Sheets

ELECTRICAL CLAMP CONNECTOR AND CONNECTING TERMINAL

Matter enclosed in heavy brackets [ ] appears in the original patent but forms no part of this reissue specification; matter printed in italics indicates the additions made by reissue.

BACKGROUND OF THE INVENTION

The invention relates to an electrical clamp connector and connecting terminal that, per pole, has at least two spring clamp connectors, which are opposite-lying and mirror-symmetric with respect to a central plane, for connecting electrical conductors, in which the electrical conductors can be plugged in from the same connection direction and by means of which the electrical conductors can be connected electrically to a common busbar in the interior of the terminal, the busbar having an additional connecting contact, which is arranged in the central plane between the two conductor clamp connections on the side of the terminal facing away from the conductor clamp connections and serves for connecting a countercontact external to the terminal.

Electrical clamp connectors and connecting terminals of this type are known (see DE 94 20 097 U1). They are produced with one pole or multiple poles; for example, in a multi-pole embodiment, several one-pole individual terminals, each of which has its own insulator housing, are arranged in series and are locked together mechanically (see FIG. 4 in DE 94 20 097 U1) or, for example, in a multi-pole embodiment, several one-pole individual terminals are arranged, in a known way, in the side-by-side receptacle chambers of a common insulator housing.

The aforementioned type of clamp connector and connecting terminal has the advantage that the electrical conductors are oriented in the same direction; that is, they can be plugged in from the same connection direction into the conductor clamp connections of the terminal and, for each pole, the terminal can produce an electrical connection to an external countercontact by means of an additionally present connecting contact on the other side of the terminal. Such a countercontact, for example, may be a terminal pin, which is soldered in a printed circuit board and can be plugged onto the terminal.

However, a drawback is that the known terminals of this type require a lot of space. In particular, the design width measured in the traverse direction to the central plane of the terminal is very large, because, for terminals of this type, the additional connecting contact for an external countercontact is arranged in the central plane between the opposite-lying conductor clamp connections.

Starting from this prior art, the problem of the invention consisted in creating a terminal of this type that makes possible a very small design construction.

SUMMARY OF THE INVENTION

The solution in accordance with the invention is characterized in that the especially small-construction design features of a terminal that is produced from a single piece of spring steel sheet and a busbar rod and is already known (see DE 196 54 523 C2) are combined with the new features that the busbar rod has at least one cross projection for forming the additional connecting contact, this cross projection being arranged in the region of the free opening of the spring steel sheet and extending through the free opening in the spring steel sheet such that the busbar rod is positioned on one side of the spring steel sheet and the cross projections for forming the additional connecting contact are positioned on the other side of the spring steel sheet.

In order to form the additional connecting contact, the busbar rod may have one or two cross projections. It is provided that two cross projections are present, which together form a socket contact. Alternatively, only one cross projection may be provided, which forms a plug-in contact.

An especially cost-effective embodiment of the invention provides, that the busbar rod (as viewed in cross section) has a V-shaped or U-shaped cross-sectional form and, with its margin edges running in the lengthwise direction of the rod, lies against the spring steel sheet and that the cross projection or cross projections of the busbar rod, starting from the margin edges of the busbar rod, project through the free opening of the spring steel sheet.

The cross projections may be produced in one piece with the busbar rod in terms of manufacturing technology. However, it is also possible for the cross projections (e.g., in the form of a socket contact) to be produced separately and joined to the busbar as a finished assembly.

DESCRIPTION OF THE DRAWINGS

Further embodiment examples of the new clamp connector and connecting terminal will be described in greater detail on the basis of the drawings.

Shown are.

DETAILED DESCRIPTION

Figure 2:
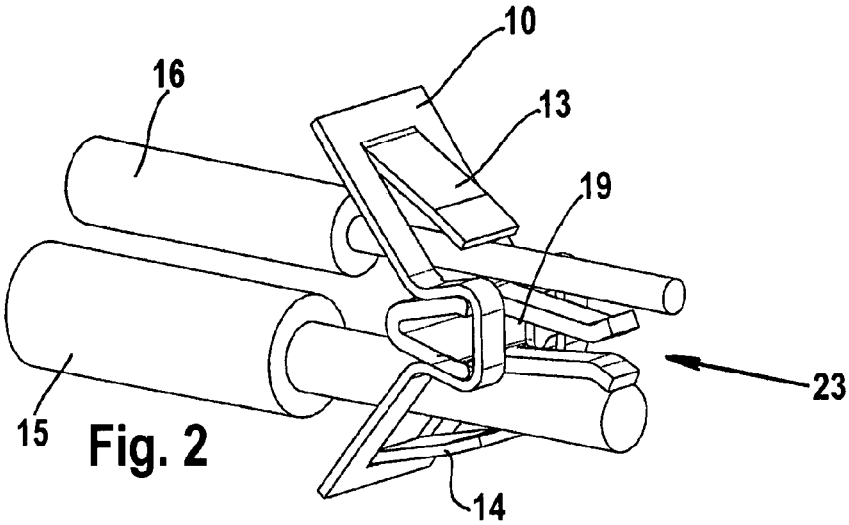
Figure 3:
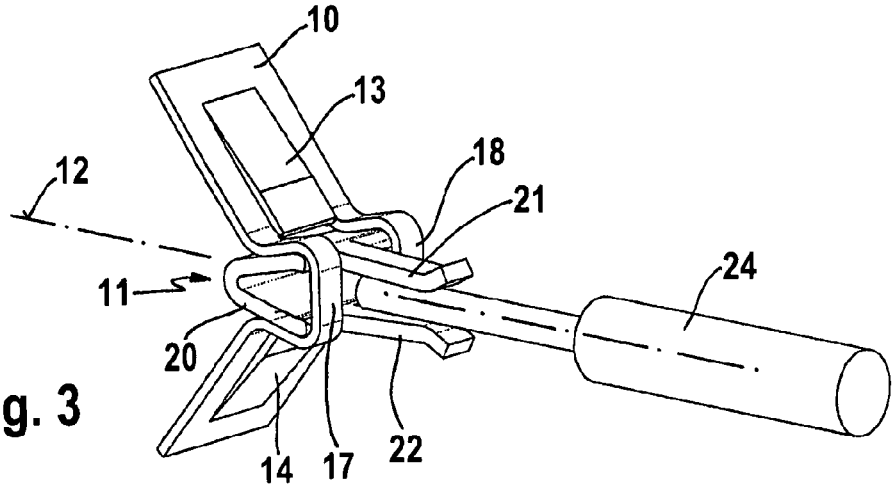

FIGS. 2 and 3 show a one-pole clamp connector and connecting terminal, consisting of one piece of spring steel sheet 10 and a busbar rod 11.

From the piece of spring steel sheet 10, a pair of leaf springs 13, 14 are cut out mirror-symmetrically to the central plane 12 (see FIG. 3) and, together with the busbar rod 11, each forms a terminal site for connecting the electrical conductors 15 and 16. The electrical conductors may have different conductor cross sections, because the cut-out leaf spring tongues 13 and 14 work independently of each other and are joined together only via the two outer crosspieces 17 and 18 (see FIG. 3) of the spring steel sheet. The crosspieces 17 and 18, in turn, are locked together with the busbar rod 11 in fixed position.

The busbar rod 11 is constructed with a V shape in cross section and has a spine 20 (in the embodiment example depicted, this is the V-shaped bent part of the busbar rod) and two cross projections 21 and 22 projecting away from it.

The cross projections 21 and 22 can make a slight spring movement relative to each other and together form a socket contact 23.

It is essential that the cross projections of the busbar rod project through the free opening 19 of the spring steel sheet 10 in such a way that the spine 20 of the busbar rod 11 is positioned on the left side of the spring steel sheet 10 as depicted in the drawing (with the consequence that the spine 20 is available for forming the conductor clamp connections for the electrical conductors 15 and 16), and that the cross projections 21 and 22 are positioned on the right side of the spring steel sheet 10 as depicted in the drawing and, in this embodiment example, form the socket contact 23.

The socket contact 23 can serve for receiving all connector pins, terminal pins, or other contact pins known in the prior art, including such solid (plug-in) electrical conductors 24 that (as depicted) can be inserted into the socket contact in the way of a connector pin.

Figure 1:
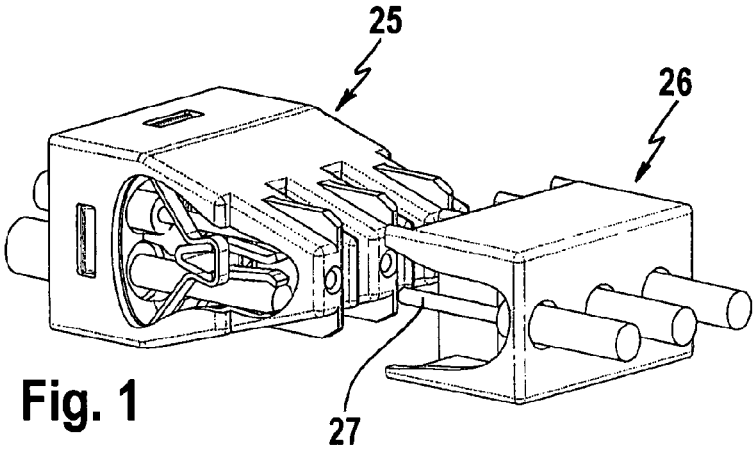
FIGS. 1-3 a first embodiment example of a terminal in accordance with the invention, FIGS. 4-6 a second embodiment example of a terminal in accordance with the invention.

FIG. 1 shows the terminal according to FIGS. 2 and 3 installed in the insulator housing of the left half 25 of the depicted 3-pole plug-in connector.

Provided for each pole in the insulator housing of the left plug-in connector half 25 is its own receptacle chamber, protected by insulation on all sides, in which the terminal is inserted via a respective opening present in the left side of the plug-in connector half 25, after which the front-side opening is closed by means of a cover (not depicted), which, at the same time, has the conductor insertion openings and the conductor guide channels for the electrical conductors 15 and 16 that are to be connected for each pole.

The other half 26 of the plug-in connector depicted in FIG. 1 is, in a known way, a plug-in connector part, which, has a respective connector pin 27 for each pole. In FIG. 1, the connector pin is formed by the stripped ends of solid electrical conductors, which are held in the insulator housing in fixed position.

The plug-in connector half 26 depicted may also be once again pulled out of the plug-in connector half 25 if necessary, this being of advantage, for example, for the installer of lighting systems, because he can remove a single lamp that has become defective from the lighting system by simple opening of the plug-in connector, without it being necessary to loosen the electrical conductors 15 and 16 wired to the single lamp, from the plug-in connector half 25.

Figure 4:
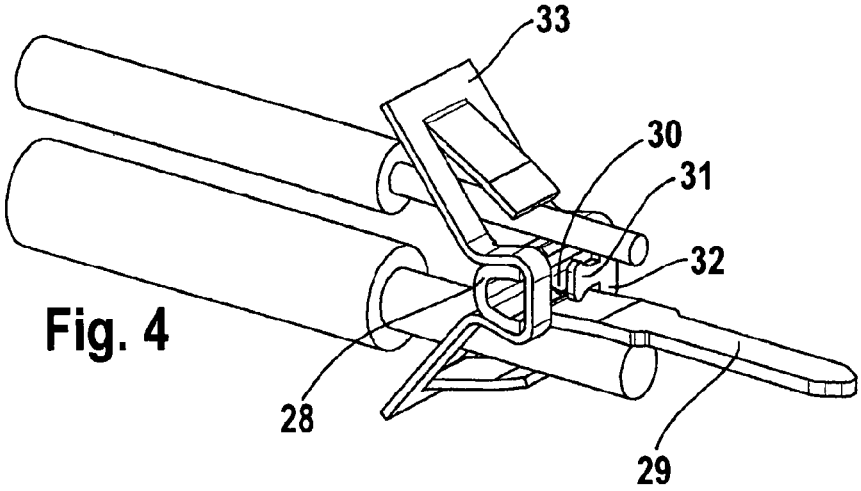

FIG. 4 shows a second embodiment example of the clamp connector and connecting terminal in accordance with the invention, in which the busbar rod 28 has only one cross projection, which is constructed in the form of a plug-in contact 29. For fixing the plug-in contact in fixed position in the free opening 30, a lug projection 31 is present on the outer crosspiece 32 of the piece of spring steel sheet 33.

Figure 5:
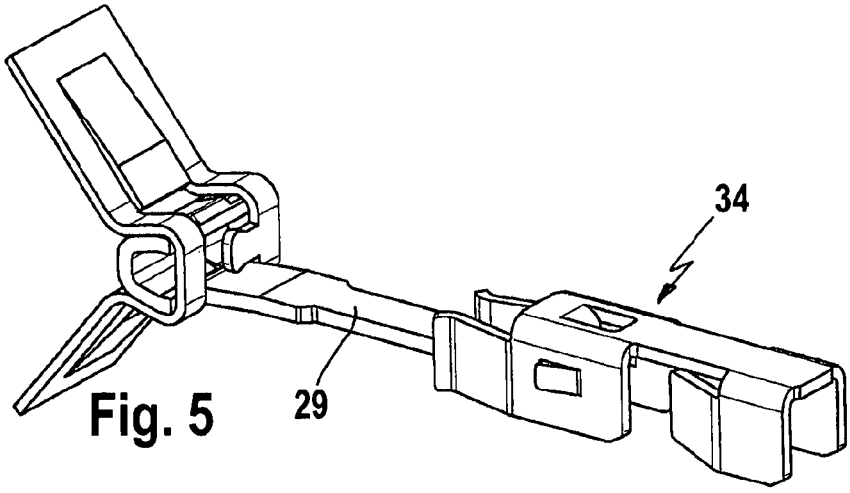

FIG. 5 shows the plug-in contact 29, which is plugged into the socket contact 34, external to the terminal, for producing an electrical connection. The design of this socket contact is known. It is also possible to use other construction designs in place of the socket contact 34 depicted in FIG. 5.

Figure 6:
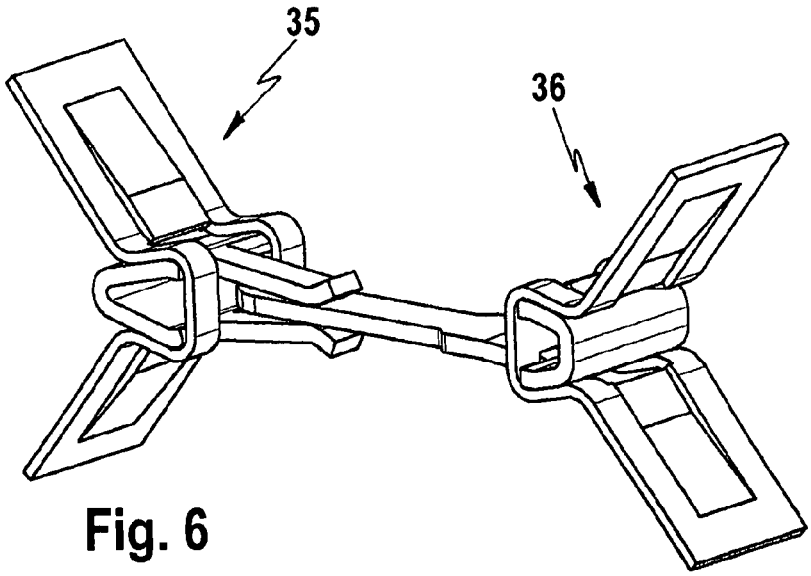

FIG. 6 shows a plug-in connector, the two plug-in connector halves of which, 35 and 36, are constructed in accordance with the teachings of the invention (compare to this FIG. 2 and FIG. 4).

What is claimed is:

1. An electrical clamp connector and connecting terminal, which, per pole, has at least two spring clamp connecting terminals, which are opposite-lying and mirror-symmetric with respect to a central plane, for connection of electrical conductors, in which the electrical conductors can be plugged in from the same connection direction and by means of which the electrical conductors can be electrically connected to a common busbar [in the interior of the terminal];

the busbar having an additional connecting contact, which is arranged in the central plane between the two [conductor] *spring* clamp *connecting* terminals on the side of the *electrical clamp connector and connecting* terminal facing away from the [conductor] *spring* clamp *connecting* terminal and serves for connecting a countercontact external to the *electrical clamp connector and connecting* terminal;

wherein the [conductor] *spring* clamp [connections] *connecting terminals* are formed from one piece of spring steel sheet and from [a] *the* busbar *which is* in the form *of* a busbar rod;

wherein two leaf spring tongues*, each having tongue ends,* are cut out mirror-symmetric to the central plane from the piece of spring steel sheet or are punched out in such a way that the leaf spring tongues each extend perpendicularly to the central plane and their tongue ends each end at a distance from the central plane;

the material of the spring steel sheet being punched out between the tongue ends, so that, a free opening is formed in the spring steel sheet;

wherein the busbar rod is positioned in the central plane lying against the piece of spring steel sheet such that, in the area of the free opening in the spring steel sheet [with the tongue ends of the leaf spring tongues], the busbar rod forms *with the tongue ends of the leaf spring tongues the* two respective opposite-lying [conductor] *spring* clamp [connections] *connecting terminals*;

whereby, for forming the additional connecting contact, the busbar rod has at least one cross projection arranged in the region of the free opening of the spring steel sheet and penetrating through the free opening in the spring steel sheet such that the busbar rod is positioned on one side of the spring steel sheet and the cross projection or cross projections for forming the additional connecting contact is or are positioned on the other side of the spring steel sheet.

2. The electrical clamp connector and connecting terminal according to claim 1, wherein the busbar rod has two cross projections in the region of the free opening of the spring steel sheet that jointly create a socket contact.

3. The electrical clamp connector and connecting terminal according to claim 1, wherein the busbar rod has one cross projection in the region of the free opening of the spring steel sheet which forms a plug-in contact.

4. The electrical clamp connector and connecting terminal according to claim 1, wherein the busbar rod has a V-shaped or U-shaped shape (when viewed in cross section) and, with its margin edges running in the lengthwise direction of the rod, lies against the spring steel sheet;

and that the cross projection or cross projections of the busbar rod, starting from the margin edges of the busbar rod, project through the free opening of the spring steel sheet.

5. An electrical clamp connector and connecting terminal, comprising:

a common busbar;

at least two spring clamp connecting terminals, which are disposed symmetric with respect to a central plane, for connection of respective electrical conductors, in which the electrical conductors can be plugged in from the same connection direction and by means of which the electrical conductors can be electrically connected to the common busbar;

the busbar having an additional connecting contact, which is arranged in the central plane between the two [conductor] *spring* clamp *connecting* terminals on the side of the *electrical clamp connector and connecting* terminal facing away from the [conductor] *spring* clamp *connecting* terminal and serves for connecting a countercontact external to the *electrical clamp connector and connecting* terminal;

the [conductor] *spring* clamp [connections] *connecting terminals* being formed from one piece of spring steel sheet and the busbar comprises a busbar rod;

the piece of spring steel sheet having two leaf spring tongues that are cut out mirror-symmetric to the central plane from the piece of spring steel sheet or are punched out in such a way that the leaf spring tongues each extend away from the central plane and their tongue ends each end at a distance from the central plane;

the material of the spring steel sheet being punched out between the tongue ends, so that a free opening is formed in the spring steel sheet;

and the busbar rod is positioned in the central plane lying against the piece of spring steel sheet such that, in the area of the free opening in the spring steel sheet with the tongue ends of the leaf spring tongues, the busbar rod forms two respective opposite-lying [conductor] *spring* clamp [connections] *connecting terminals*;

whereby, for forming the additional connecting contact, the busbar rod has at least one cross projection arranged in the region of the free opening of the spring steel sheet and penetrating through the free opening in the spring steel sheet such that the busbar rod is positioned on one side of the spring steel sheet and the cross projection or cross projections for forming the additional connecting contact is or are positioned on the other side of the spring steel sheet.

6. The electrical clamp connector and connecting terminal according to claim 5 wherein the busbar rod has two cross projections in the region of the free opening of the spring steel sheet.

7. The electrical clamp connector and connecting terminal according to claim 6 wherein the two cross projections create a socket contact.

8. The electrical clamp connector and connecting terminal according to claim 5 wherein the busbar rod has one cross projection in the region of the free opening of the spring steel sheet.

9. The electrical clamp connector and connecting terminal according to claim 8 wherein one cross projection in the region of the free opening of the spring steel sheet forms a plug-in contact.

10. The electrical clamp connector and connecting terminal according to claim 5 wherein the busbar rod has a V-shaped or U-shaped shape (when viewed in cross section) and, with its margin edges running in the lengthwise direction of the rod, lies against the spring steel sheet.

11. The electrical clamp connector and connecting terminal according to claim 10 wherein the cross projection or cross projections of the busbar rod, starting from the margin edges of the busbar rod, project through the free opening of the spring steel sheet.

* * * * *